United States Patent Office 2,837,523
Patented June 3, 1958

2,837,523
ANTHRAQUINONE VAT DYESTUFFS

Maurice Grelat and Jacob Koch, Basel, and Paul Sutter, Binningen, and Walter Kern, Sissach, Switzerland, assignors to Ciba Limited, Basel Switzerland, a Swiss firm No Drawing. Application December 19, 1952
Serial No. 327,032

Claims priority, application Switzerland
December 21, 1951

6 Claims. (Cl. 260—276)

According to this invention valuable new anthraquinone vat dyestuffs are made by treating with a carbazolizing agent a trianthrimide, in which the imido bridges bound to the central anthraquinone nucleus are in the 1:4-position relatively to one another and in which a single anthraquinone radical in an end position contains a fused on acridone ring and the —NH-group of the latter ring is in para-position relatively to the anthrimide bridge.

As will be understood from the foregoing definition, the trianthrimides serving as starting materials in the present process contain the structure of the constitution

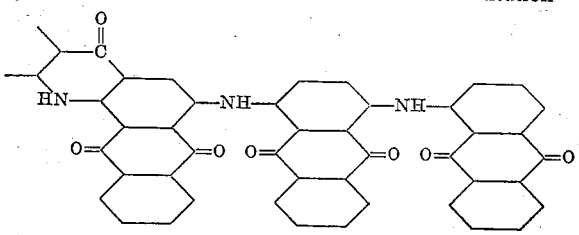

The ring fused on the heterocyclic ring may, for example, be a naphthalene ring or especially a benzene ring, and these rings may contain substituents of the kind usual in vat dyestuffs, for example, halogen atoms such as chlorine, methoxy groups or phenyl or phenoxy radicals. The anthraquinone nuclei may also contain substituents, and substituents of the aforesaid kind may advantageously be present in the central anthraquinone nucleus and/or in the end anthraquinone radical to which the acridone ring is not fused. Thus, for example, the aforesaid end anthraquinone radical may contain in an α-position, for example, in the 4- or 5-position relatively to the anthrimide bridge an acylamino group, if desired, a benzoylamino group in which the benzene radical is substituted or unsubstituted, and the central anthraquinone nucleus may contain a halogen atom or atoms, such as chlorine as substituents in one or both of the β-positions of the 6-membered ring not bound to the anthrimide bridges. Especially advantageous results are obtained, for example with trianthrimides which are free from substituents in the anthraquinone nuclei.

Such trianthrimides can be obtained with advantage by the reaction of 4-halogen-1:1'-dianthrimides with 4-aminoanthraquinone-2:1(N)-benz- or naphthacridones.

As carbazolizing agents there may be used, for example, mixtures containing titanium tetrachloride or aluminum chloride, for example, mixture or loose addition compounds of aluminum chloride with sodium chloride or with pyridine bases, such as pyridine itself, picolines, or similar tertiary bases. The carbazolization is advantageously carried out at a temperature above 130° C., for example, at 140–160° C.

The new anthraquinone vat dyestuffs of the invention are carbazoles which contain a single acridone ring and correspond to the formula

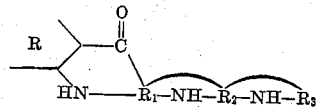

in which $R_1$, $R_2$ and $R_3$ represent anthraquinone radicals, and R represents an aromatic radical fused on to the heterocyclic ring in the manner indicated, and in which the —NH— groups bound to the anthraquinone radicals $R_1$ and $R_2$ are in 1:4-position relatively to one another and the anthraquinone radical $R_3$ is bound in α-position to the —NH— group.

These vat dyestuffs are distinguished by producing valuable tints, for example, within the range of green to olive, and also by producing dyeings having a good fastness to light, chlorine and bucking. They can be used in known manner as pigments or for dyeing or printing (for example, by the so-called potash process) a very wide variety of materials, for example, cotton, linen, artificial silk or staple fibers of regenerated cellulose, and other cellulose fibers, and also silk, wool, wholly synthetic fibers such as those of superpolyamides or superpolyurethane. Furthermore, the new dyestuffs can also be converted by methods in themselves known into leuco preparations, especially sulfuric acid ester salts, and used for dyeing or printing by methods known for this class of dyestuffs.

The following examples illustrate the invention, the parts and percentages being by weight unless otherwise stated, and the relationship of parts by weight to parts by volume being the same as that of the kilogram to the liter:

Example 1

15.4 parts of 4-chloro-1:1'-dianthrimide, 11.35 parts of 4-aminoanthraquinone-2:1(N)-benzacridone, 5 parts of sodium carbonate, 0.5 parts of cuprous chloride and 250 parts of nitrobenzene are finely ground at room temperature, and then heated while stirring and maintained at 210° C. for 10 hours. After cooling, the condensation product is separated by filtering with suction, and the residue is treated with steam.

The aqueous suspension of the product free from nitrobenzene is acidified with hydrochloric acid, filtered with suction, and the filter residue washed neutral and dried. The condensation product is a dark powder which dissolves in concentrated sulfuric acid with an olive-black coloration.

100 parts of aluminum chloride are introduce at 10–70° C. into 200 parts of anhydrous pyridine, while stirring. The mixture is heated up to 100° C., and at that temperature 20 parts of condensation product obtained as described in the preceding paragraph are added. In the course of 45 minutes the temperature is raised to 139–141° C. with the simultaneous distillation of pyridine. The whole is stirred for one hour at 140° C., and the reaction mixture is poured into 3000 parts of cold water.

To the suspension are added 400 parts of sodium hydroxide solution of 30 percent strength and 100 parts of sodium hypochlorite solution containing about 10 percent of active chlorine. The mixture is heated to 90° C., filtered with suction, and the filter residue is washed neutral and dried. The dyestuff is a dark powder which dissolves in concentrated sulfuric acid with a dirty violet coloration and dyes cotton from a yellow-brown vat fast black-olive tints.

*Example 2*

4.65 parts of 4-chloro-1:1'-dianthrimide, 4.1 parts of 4 - amino-3':5'-dichloro - 2:1(N) - 1':2'(N)-anthraquinone-benzacridone, 3 parts of sodium carbonate, 0.2 part of cuprous chloride and 70 parts of nitrobenzene are heated for 10 hours at 210° C. while stirring. After cooling, the condensation product is separated by filtering with suction, and then washed with alcohol. The trianthrimide is then extracted at the boil with hydrochloric acid of 2 percent. strength, the mixture is filtered with suction, and the filter residue is washed neutral and dried. It is a dark violet powder which dissolves in concentrated sulfuric acid with an olive-black coloration.

25 parts of aluminum chloride are introduced at 10–70° C. into 50 parts of dry pyridine, while stirring. The mixture is heated up to 100° C., and at that temperature 5 parts of the condensation product obtained as described in the preceding paragraph are added. In the course of 45 minutes the temperature is raised to 139–141° C. with the simultaneous distillation of pyridine. The whole is then stirred for one hour at 140° C. and the reaction product is poured into cold water. To the resulting suspension there are added 120 parts of sodium hydroxide solution of 30 percent strength and 25 parts of sodium hypochlorite solution containing 10 percent of active chlorine. The whole is heated to 90° C. while stirring, then filtered with suction, and the filter residue is washed neutral and dried. The dyestuff is a dark powder which dissolves in concentrated sulfuric acid with a dirty violet coloration, and dyes cotton from a yellow-brown vat fast black olive tints which are somewhat darker than those obtained with the dyestuff of Example 1.

*Example 3*

9.27 parts of 4-chloro-1:1'-dianthrimide, 8.64 parts of 4 - amino - 3'-phenoxy-2:1(N)-1':2'(N)-anthraquinone-benzacridone, 0.2 part of copper acetate, 4 parts of sodium carbonate and 120 parts of nitrobenzene are heated for 8 hours at 210° C. while stirring. After cooling, the condensation product is filtered off with suction and then washed with alcohol. The dry anthrimide is then extracted at the boil with hydrochloric acid of 2 percent strength, the mixture is filtered with suction, and the filter residue is washed neutral and dried. It is a black-violet powder which dissolves in concentrated sulfuric acid with an olive coloration.

25 parts of aluminum chloride are introduced at 10–90° C. into 50 parts of pyridine while stirring. At 100° C. there are added to the resulting melt 5 parts of the condensation product obtained as described in the preceding paragraph. The temperature is raised to 139–141° C. in the course of 45 minutes with the simultaneous distillation of pyridine. The whole is then stirred for one hour at 140° C., and the reaction product is poured into cold water. To the resulting suspension are added 120 parts of sodium hydroxide solution of 30 percent strength and 25 parts of sodium hypochlorite solution containing 10 percent of active chlorine. The whole is heated while stirring to 90° C., filtered with suction, and the filter residue is washed neutral and dried. The dyestuff is a dark powder which dissolves in concentrated sulfuric acid with a dirty violet coloration and dyes cotton from an orange brown vat fast olive tints.

*Example 4*

9.27 parts of 4-chloro-1:1'-dianthrimide, 7.8 parts of 4 - amino - 2:1(N)-1':2'(N) - anthraquinone - naphthacridone 0.2 part of copper acetate, 4 parts of sodium carbonate and 120 parts of nitrobenzene are heated for 8 hours at 210° C., while stirring. After cooling, the condensation product is filtered off with suction, and then washed with alcohol. The trianthrimide is then extracted at the boil with hydrochloric acid of 2 strength, filtered off with suction, and the filter residue is washed neutral and dried. It is a black powder which dissolves in concentrated sulfuric acid with an olive-yellow coloration.

The resulting trianthrimide is carbazolized in the manner described in the second paragraph of Example 3. The dyestuff is a dark powder which dissolves in concentrated sulfuric acid with a black-violet coloration and dyes cotton from an orange-brown vat fast grey-olive tints.

*Example 5*

15.4 parts of 4-chloro-1:1'-dianthrimide, 13.8 parts of 4 - amino - 5' - phenyl - 2:1(N)-1':2'(N)-anthraquinone-benzacridone, 0.2 part of cuprous chloride, 5 parts of sodium carbonate and 250 parts of nitrobenzene are maintained for 8 hours at 210° C., while stirring. After cooling, the condensation product is filtered off with suction and then washed with alcohol. The trianthrimide is then extracted at the boil with hydrochloric acid of 2 percent strength, filtered off with suction, and the filter residue is washed neutral and dried. It is a black powder which dissolves in concentrated sulfuric acid with a dark green coloration.

The resulting trianthrimide is carbazolized in the manner described in the second paragraph of Example 3. The dyestuff is a dark powder which dissolves in concentrated sulfuric acid with a black-violet coloration and dyes cotton from an orange-brown vat fast olive tints.

The 4 - amino - 5'- phenyl-2:1(N)-1':2'(N)-anthraquinone-benzacridone used in the first paragraph of this example can be prepared, for example, as follows:

33 parts of 1-chloro-4-nitroanthraquinone-2-carboxylic acid, 21 parts of 4-amino-1:1'-diphenyl and 300 parts of ortho-dichlorobenzene are heated for 2 hours at 170–180° C., while stirring. After cooling, the 4-nitro-1-(para-phenyl)-anilido-anthraquinone-2-carboxylic acid is filtered off with suction, washed with ether and dried.

40 parts of 4-nitro-1-(para-phenyl)-anilido-anthraquinone-2-carboxylic acid, 50 parts of benzoyl chloride and 250 parts of ortho-dichlorobenzene are stirred for 2 hours at 160° C. After cooling the handsome dark red crystals of the precipitated 4-nitro-5'-phenyl-2:1(N)-1':2'(N)-anthraquinone-benzacridone are filtered off with suction, washed first with ortho-dichlorobenzene and then with ether, and dried. The following values have been found by analysis of a product obtained as described above:

| | Found | Calculated |
|---|---|---|
| C | 72.28 | 72.64 |
| H | 3.15 | 3.16 |
| N | 6.02 | 6.28 |

The nitro group is reduced, for example, with sodium sulfide in known manner. The resulting 4-amino-5'-phenyl-2:1(N)-1':2'(N)-anthraquinone benzacridone is a green-blue powder which dissolves in concentrated sulfuric acid with an orange coloration.

*Example 6*

5.6 parts of 4-(4''-amino-1''-anthraquinonyl)-aminoanthraquinone - 2:1(N)-1':2'(N) - benzacridone (obtainable by condensing 4-nitroanthraquinone-2:1(N)-benzacridone with 1-amino-4-chloroanthraquinone followed by reduction of the nitro group), 3.8 parts of 1-chloro-5-benzoylaminoanthraquinone, 1 part of anhydrous sodium acetate, 0.5 part of magnesium oxide and 0.5 parts of cuprous chloride are mixed in a finely divided state with 100 parts of nitrobenze. The whole is heated and stirred while boiling well until the starting products have disappeared. After cooling to 90° C., the mixture is filtered with suction. The filter residue is purified by treatment with nitrobenzene, alcohol, dilute hydrochloric acid and water, and then dried. The resulting powder is a trianthrimide of the formula part of cuprous chloride are mixed in a finely powdered state with 80 parts of nitrobenzene. The mixture is heated and stirred while boiling well until the starting products have disappeared. After cooling to 80° C., the mixture is filtered with suction. The filter residue is purified by treatment with nitrobenzene, alcohol, dilute hy-

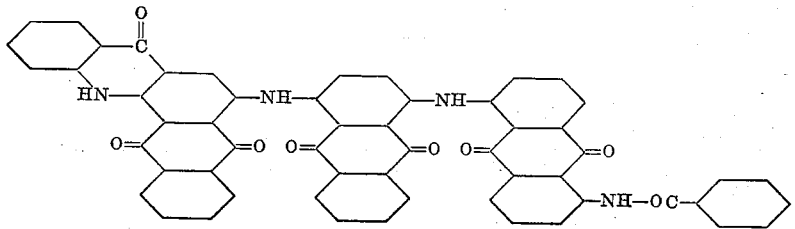

6 parts of the latter trianthrimide are introduced at 140° C. into a thinly fluid homogeneous melt, which has been prepared from a mixture of 60 parts of sublimed aluminum chloride and 12 parts of dry powdered sodium chloride. The whole is stirred for about one hour at 150–155° C. The liquid melt is then added to a solution of 90 parts of sodium hydroxide in 1360 parts of water, the resulting suspension is vigorously mixed for one hour at 70° C. and then filtered with suction. The washed residue is added to a solution of 90 parts of sulfuric acid of 100 percent strength in 270 parts of water. The resulting suspension is vigorously mixed for one hour at 70° C. and then filtered with suction. The residue is washed neutral and dried. The dyestuff so obtained is a dark powder which dissolves in concentrated sulfuric acid with a violet brown coloration and dyes cotton from an olive-brown vat powerful olive tints having very good properties of fastness.

By using as carbazolizing agent, instead of an aluminum chloride-sodium chloride melt, a mixture of aluminum chloride and a commercial mixture of $\beta$- and $\gamma$-picoline a dyestuff is obtained having similar properties.

Instead of 1-chloro-5-benzoylaminoanthraquinone there may be used 1-chloro-4-benzoylaminoanthraquinone in the manner described above for making a trianthrimide, and the latter is carbazolized.

Example 7

10.1 parts of 1-amino-4-nitro-6:7-dianthraquinone, 11.3 parts of 4 - chloranthraquinone-2:1(N)-1':2'(N)-benz-acridone, 4 parts of anhydrous sodium carbonate, 1.5 parts of magnesium oxide and 0.6 part of copper carbonate are mixed in a finely powdered state with 200 parts of nitrobenzene. The whole is heated and stirred while boiling well until the starting products have disappeared. After cooling, the mixture is filtered with suction at 50° C. The residue is purified by treatment with nitrobenzene, alcohol, dilute hydrochloric acid and water, and is then dried.

13.2 parts of the finely powdered nitro-dianthrimide obtained as described in the preceding paragraph are mixed with 160 parts of nitrobenzene, the mixture is heated to 110° C., and 4.5 parts of hydrazine hydrate (in the form of an ordinary commercial aqueous solution) are added in small portions in the course of about 1½ hours. The whole is stirred for about 1 hour longer at 100–110° C., and is then filtered with suction. The filter residue is purified by treatment with nitrobenzene alcohol, dilute hydrochloric acid and water, and is then dried.

6.3 parts of the amino-dinathrimide so obtained, 2.9 parts of 1-chloranthraquinone, 1.4 parts of anhydrous sodium carbonate, 0.5 part of magnesium oxide and 0.5 drochloric acid and water, and is then dried. The powder so obtained is the trianthrimide of the formula

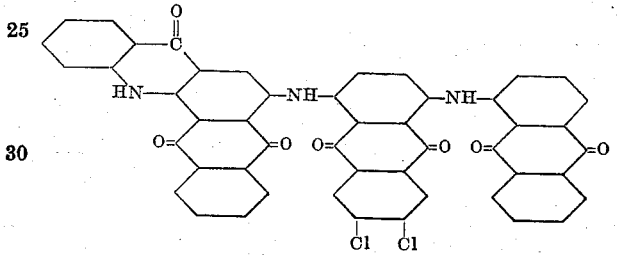

By carbazolizing the above trianthrimide with an aluminum chloride-sodium chloride melt in the manner described in paragraph 2 of Example 6, there is obtained a dyestuff which dissolves in concentrated sulfuric acid with a violet-brown coloration and dyes cotton from an orange brown vat powerful bluish olive tints having very good properties of fastness.

By using for the carbazolization aluminum chloride and $\beta$- and $\gamma$-picoline, instead of aluminum chloride and sodium chloride, there is obtained a dyestuff having similar properties.

Example 8

1 part of the carbazole obtained as described in Example 1 is vatted with the addition of 0.5 part of Turkey red oil in 100 parts of water by means of 2 parts by volume of caustic soda solution of 36° Bé. and 1 part of sodium hydrosulfite at about 50° C.

The stock vat so prepared is added to a dyebath consisting of 2000 parts of water containing 7 parts by volume of caustic soda solution of 36° Bé. and 6 parts of sodium hydrosulfite, and 100 parts of wetted cotton are entered into the dyebath at 40° C. After 15 minutes 10 parts of sodium chloride are added and dyeing is carried on for one hour while slowly raising the temperature to 50° C. The cotton is then squeezed, oxidized in the air, rinsed, acidified, soaped at the boil, again rinsed and dried. It is dyed a fast black-olive tint.

What is claimed is:

1. An anthraquinone dyestuff of the formula

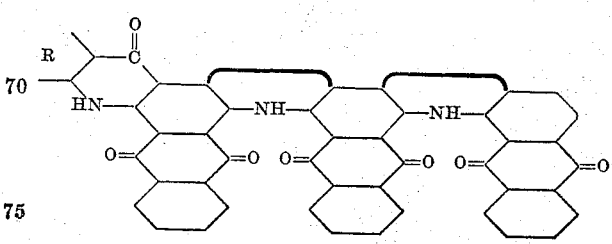

in which R represents a radical selected from the group consisting of the radicals corresponding to the formulae

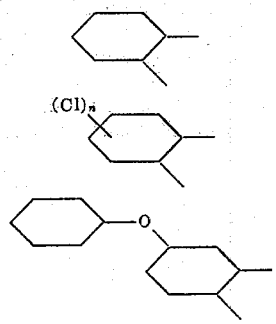

and

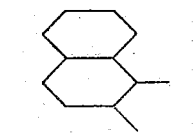

in which $n$ is a number of at most two.

2. The anthraquinone vat dyestuff of the formula

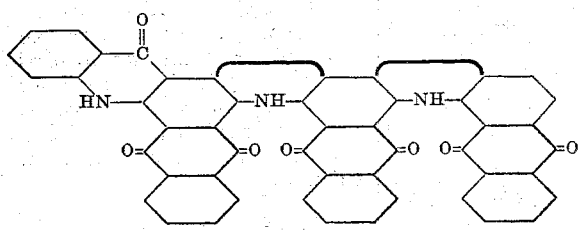

3. The anthraquinone vat dyestuff of the formula

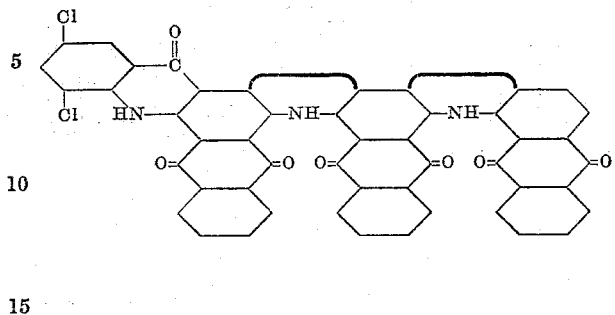

4. The anthraquinone vat dyestuff of the formula

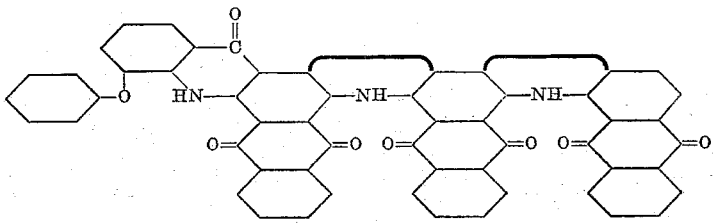

5. The anthraquinone vat dyestuff of the formula

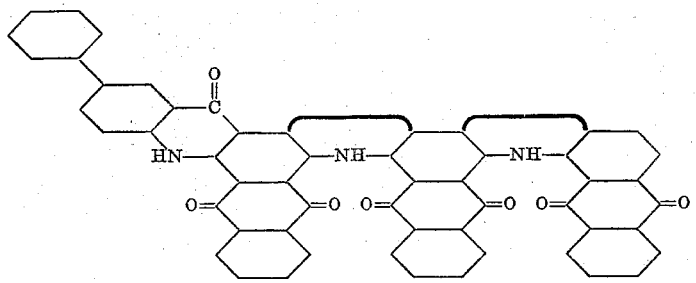

6. The anthraquinone vat dyestuff of the formula

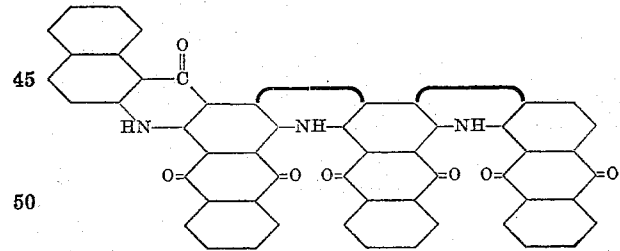

References Cited in the file of this patent

UNITED STATES PATENTS

| | | |
|---|---|---|
| 1,690,307 | Mieg | Nov. 6, 1928 |
| 1,878,965 | Mieg | Sept. 20, 1932 |
| 2,036,663 | Weiland | Apr. 7, 1936 |
| 2,212,965 | Wieners | Aug. 27, 1940 |
| 2,315,537 | Miller | Apr. 6, 1943 |

OTHER REFERENCES

Synthetic Dyes, vol. II, Venkataraman, Academic Press, N. Y. (1952), page 899.

UNITED STATES PATENT OFFICE

CERTIFICATE OF CORRECTION

Patent No. 2,837,523                                                June 3, 1958

Maurice Grelat et al.

It is hereby certified that error appears in the printed specification of the above numbered patent requiring correction and that the said Letters Patent should read as corrected below.

Column 2, line 45, for "parts" read -- part --; line 57, for "introduce" read -- introduced --; column 4, line 4, after "done" insert a comma; line 75, for "parts" read -- part --; column 5, line 2, for "nitrobenze" read -- nitrobenzene --; line 73, for "amino-dinathrimide" read -- amino-dianthrimide --.

Signed and sealed this 2nd day of December 1958.

(SEAL)
Attest:

KARL H. AXLINE
Attesting Officer

ROBERT C. WATSON
Commissioner of Patents